US010245690B2

(12) United States Patent
Seitz et al.

(10) Patent No.: US 10,245,690 B2
(45) Date of Patent: Apr. 2, 2019

(54) DEVICE FOR HOLDING THE CONTROL CONSOLE OF A MACHINE TOOL

(71) Applicants: DMG MORI AKTIENGESELLSCHAFT, Bielefeld (DE); DMG MORI CO., LTD., Yamatokoriyama-shi, Nara (JP)

(72) Inventors: Reinhold Seitz, Hopferau (DE); Alexander Strebelow, Wasserburg (DE)

(73) Assignees: DMG MORI AKTIENGESELLSCHAFT, Bielefeld (DE); DMG MORI CO., LTD., Yamatokoriyama-Shi (JP)

( * ) Notice: Subject to any disclaimer, the term of this patent is extended or adjusted under 35 U.S.C. 154(b) by 0 days.

(21) Appl. No.: 15/021,840

(22) PCT Filed: Sep. 11, 2014

(86) PCT No.: PCT/EP2014/069402
§ 371 (c)(1),
(2) Date: Mar. 14, 2016

(87) PCT Pub. No.: WO2015/036487
PCT Pub. Date: Mar. 19, 2015

(65) Prior Publication Data
US 2016/0221133 A1    Aug. 4, 2016

(30) Foreign Application Priority Data

Sep. 13, 2013   (EP) .................................... 13184333

(51) Int. Cl.
*G06F 1/16*   (2006.01)
*B23Q 1/00*   (2006.01)
(Continued)

(52) U.S. Cl.
CPC .............. *B23Q 1/0045* (2013.01); *F16F 7/00* (2013.01); *F16M 11/10* (2013.01);
(Continued)

(58) Field of Classification Search
CPC ......... F16M 11/06; F16M 11/08; F16M 11/10
See application file for complete search history.

(56) References Cited

U.S. PATENT DOCUMENTS 363,995 A  *  5/1887  Dunklee .............. A47B 95/043
                                            248/345.1
2,596,780 A  *  5/1952  Meyers .................... B60G 7/04
                                            16/86 A
(Continued)

FOREIGN PATENT DOCUMENTS

CN      101372080 A      2/2009
DE  202007008317 U1      8/2007
(Continued)

OTHER PUBLICATIONS

Dec. 27, 2016 Office Action issued in Chinese Patent Application No. 201480050358.3.
(Continued)

*Primary Examiner* — Anthony Q Edwards
(74) *Attorney, Agent, or Firm* — Oliff PLC

(57) ABSTRACT

An apparatus for use with a machine tool, including an operating panel via which the machine tool can be controlled by an user and a supporting arm holding the operating panel, which can be mounted on the machine tool by means of a hinge in such a way that the supporting arm holding the operating panel can be pivoted relatively to the machine tool about a vertical axis of the hinge, wherein the apparatus is provided with at least one damping element and/or which dampens an impact of the apparatus which occurs, because of a collision between the apparatus and the machine tool,
(Continued)

when the supporting arm is pivoted with respect to the machine tool about a vertical axis.

9 Claims, 8 Drawing Sheets

(51) Int. Cl.
    *F16M 11/10*     (2006.01)
    *F16M 11/20*     (2006.01)
    *F16M 13/02*     (2006.01)
    *F16F 7/00*     (2006.01)
    *G06F 1/18*     (2006.01)

(52) U.S. Cl.
    CPC ........ *F16M 11/2014* (2013.01); *F16M 13/02* (2013.01); *G06F 1/181* (2013.01); *F16M 2200/06* (2013.01)

(56) References Cited

U.S. PATENT DOCUMENTS

| | | | | |
|---|---|---|---|---|
| 3,426,986 A * | 2/1969 | Pool | A47B 91/04 | 108/56.1 |
| 3,721,417 A * | 3/1973 | Skala | F16F 3/12 | 267/140.11 |
| 3,869,106 A * | 3/1975 | Gregov | A47B 95/043 | 108/27 |
| 4,105,220 A * | 8/1978 | Pacific | B62J 23/00 | 280/304.4 |
| 5,264,259 A * | 11/1993 | Satoh | B60R 19/34 | 428/34.5 |
| 5,485,793 A * | 1/1996 | Crowell | B60N 3/002 | 108/44 |
| 5,487,524 A | 1/1996 | Bergetz | | |
| 5,564,667 A * | 10/1996 | Copeland | A47B 21/0314 | 248/160 |
| 5,639,072 A * | 6/1997 | McCall | A47B 95/043 | 248/345.1 |
| 5,842,674 A * | 12/1998 | Freeman | A47B 95/043 | 248/345.1 |
| 6,044,601 A * | 4/2000 | Chmela | E04F 19/028 | 248/345.1 |
| 6,162,523 A | 12/2000 | Metelski et al. | | |
| 6,251,493 B1 * | 6/2001 | Johnson | F16F 1/37 | 428/220 |
| 6,286,794 B1 * | 9/2001 | Harbin | A47B 21/02 | 248/123.2 |
| 6,314,688 B1 * | 11/2001 | Ford | A62B 99/00 | 52/101 |
| 6,364,582 B1 * | 4/2002 | Hoppe | B23Q 11/0891 | 144/251.2 |
| D526,189 S * | 8/2006 | Haymond | D8/402 | |
| 7,445,583 B2 * | 11/2008 | Chen | A63B 71/0622 | 248/123.11 |
| 7,527,155 B2 * | 5/2009 | McClain | G06F 1/181 | 211/126.2 |
| 7,566,877 B2 * | 7/2009 | Bhatt | H01L 27/14658 | 206/586 |
| 7,901,001 B2 * | 3/2011 | Seitz | B23Q 1/0009 | 297/174 R |
| 7,965,500 B1 * | 6/2011 | Bruce | G06F 1/1656 | 220/732 |
| 7,995,331 B2 * | 8/2011 | Seitz | B23Q 1/0045 | 248/278.1 |
| 8,182,895 B2 * | 5/2012 | Myler | B32B 5/32 | 248/345.1 |
| 2002/0085342 A1 * | 7/2002 | Chen | G06F 1/1616 | 361/679.55 |
| 2003/0038054 A1 * | 2/2003 | Hurley | B65D 81/056 | 206/586 |
| 2004/0066618 A1 * | 4/2004 | Layton | G01D 11/245 | 361/679.01 |
| 2004/0244512 A1 * | 12/2004 | Hedrich | F16M 11/08 | 73/866.5 |
| 2006/0169906 A1 * | 8/2006 | Bhatt | H01L 27/14658 | 250/370.09 |
| 2006/0245152 A1 * | 11/2006 | Chauhan | H04M 1/0283 | 361/679.26 |
| 2009/0020679 A1 * | 1/2009 | Seitz | B23Q 1/0045 | 248/677 |
| 2009/0050781 A1 | 2/2009 | Seitz et al. | | |
| 2012/0049425 A1 * | 3/2012 | Willis | H05K 7/142 | 267/141 |
| 2012/0248668 A1 * | 10/2012 | Umemura | F16F 13/107 | 267/140.11 |
| 2013/0193290 A1 * | 8/2013 | Lohmann | B60R 11/0252 | 248/276.1 |
| 2015/0211592 A1 * | 7/2015 | Rawson | F16F 1/3732 | 267/141.1 |
| 2016/0224009 A1 * | 8/2016 | Seitz | G05B 19/409 | |

FOREIGN PATENT DOCUMENTS

| | | |
|---|---|---|
| EP | 2028580 A1 | 2/2009 |
| EP | 2110200 A1 | 10/2009 |
| WO | 95/29362 A1 | 11/1995 |
| WO | 97/20166 A1 | 6/1997 |

OTHER PUBLICATIONS

Nov. 19, 2014 Search Report issued in International Patent Application No. PCT/EP2014/069402.

* cited by examiner

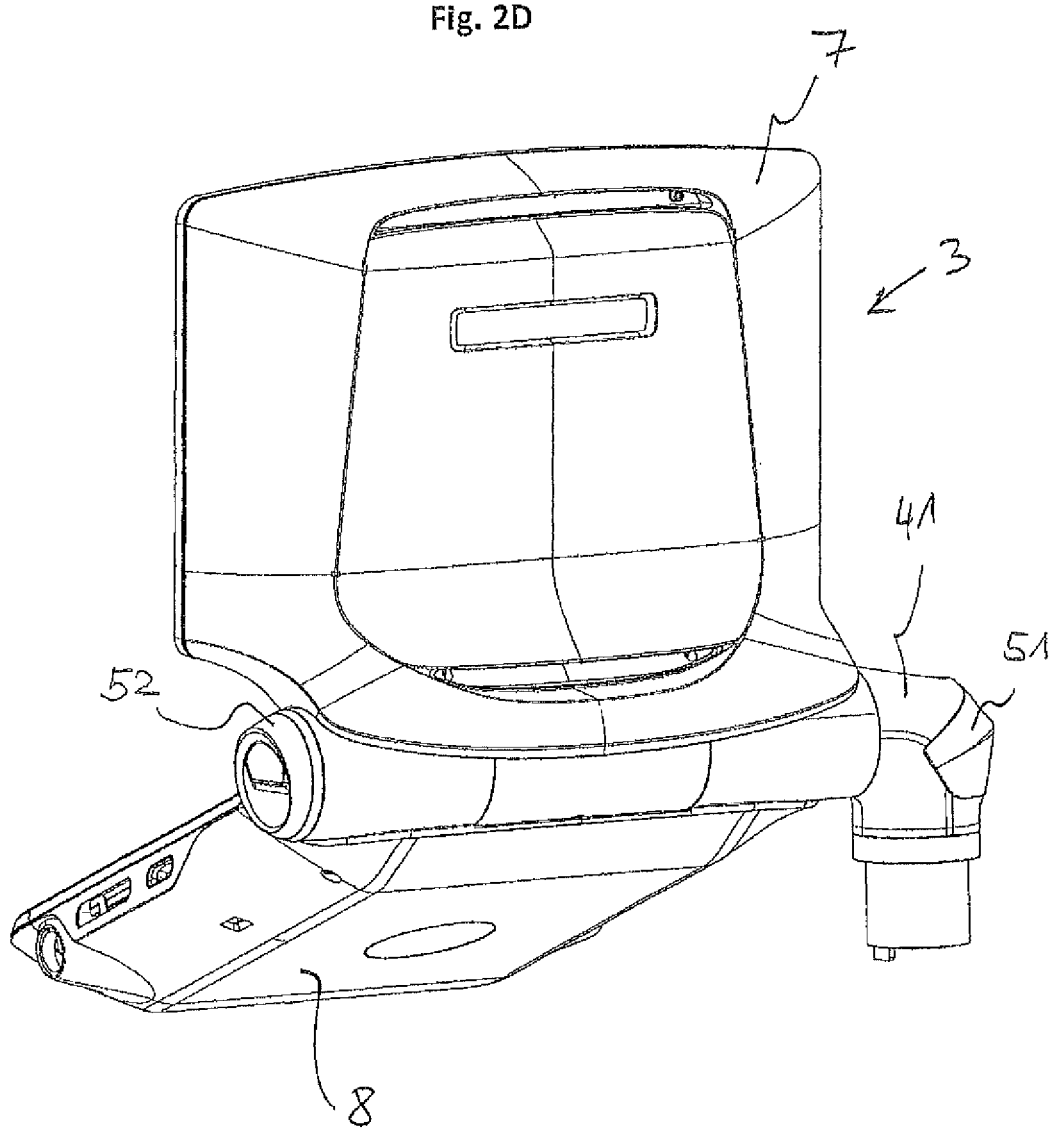

DEVICE FOR HOLDING THE CONTROL CONSOLE OF A MACHINE TOOL

The invention relates to an apparatus for use with a machine tool and a machine tool provided with such an apparatus.

In order to operate or to control a machine tool, in particular a numerically controlled machine tool, by an user, an operating panel or an operating device and/or a control device can be used which is easily accessible from the outside of the machine tool for the user, but is also connected with the machine tool via a supporting arm.

The operating panel or the operating device and/or control device, generally comprises a display unit (e.g. a monitor) for displaying the tool machine control information and an input unit (e.g. keyboard, mouse, trackball, operating button) for inputting the tool machine control information or operating information. Usually, the operating panel can be moved with respect to the machine tool, e.g. by pivoting the supporting arm with respect to the machine tool.

The object of the present invention is to create an apparatus which enables an user to operate a machine tool in a flexible way and to avoid damage to the operating panel and the machine tool housing when operating the machine tool.

For solving this object, the invention provides an apparatus according to claim 1. Advantageous embodiments and developments of the inventive idea can be found in the dependent claims.

According to an embodiment of the invention, an apparatus is provided which comprises an operating panel for controlling a machine tool as well as a supporting arm via which the operating panel can be connected to the machine tool. The apparatus is provided with at least one damping element which is suitable for dampening the vibrations of the apparatus, which occur, when the apparatus bumps against the machine tool (or an external object), because of a relative motion between the apparatus and the machine tool.

If the apparatus is constructed in such a way, for example, that the supporting arm can be moved and/or pivoted and/or rotated with respect to the machine tool according to the invention, many types of impacts which result from such movements of the supporting arm relative towards the machine tool can be damped, when one or more damping elements are mounted on a suitable position of the operating panel and/or the supporting arm.

In particular, for example, impacts can be mitigated which occur when pivoting too far so that the operating panel bumps against the machine tool or the machine tool housing (e.g. the external machine tool cabin wall) or other external objects being on the path along which the operating panel is conducted when pivoting. Furthermore, impacts can be mitigated which occur when the supporting arm is drawn into the tool machine or when a door or a clap of the tool machine opposite to the operating panel is opened too far in the direction of the operating panel.

According to a first aspect, an apparatus for use with a machine tool having an operating panel via which the tool machine is controllable by a an user and a supporting arm holding or bearing the operating panel, is proposed in the meaning of the invention. The supporting arm can be mounted on the machine tool by means of a hinge in such a way that the supporting arm holding or bearing the operating panel can be pivoted relatively towards the machine tool about a vertical axis of the hinge. In this case, vertical generally means vertical with respect to a workshop floor on which the machine tool can be set up.

According to the invention, the apparatus is provided with at least one damping element, especially an integral damping element which absorbs the impact of the apparatus resulting from the collision between the apparatus and the tool machine when the supporting arm is pivoted about the vertical axis towards the machine tool.

According to a second aspect, in the sense of the invention, a numerically controlled machine tool is proposed, comprising an apparatus according to the aforesaid first claim and also a hinge, wherein the supporting arm holds or bears the operating panel and is mounted on the machine tool by means of the hinge in such a way that the supporting arm holding the operating panel can be pivoted relatively towards the machine tool about the vertical axis of the hinge, and the apparatus is provided with at least one damping element which absorbs an impact of the apparatus resulting from a collision between the apparatus and the machine tool when the supporting arm is pivoted about the vertical axis towards the machine tool.

According to a preferred embodiment of the invention, the operating panel comprises a hinge element (or axle member) held by the supporting arm, on which a display unit or input unit of the operating panel is held. The hinge element preferably extends along a horizontal axis and the display unit and/or the input unit can preferably be pivoted about a horizontal axis.

Preferably at least the one damping element extends beyond the display unit and/or the input unit away from the operating panel in the direction of the horizontal axis and thus forms an exposed point in the direction of the horizontal axis so that the damping element absorbs impacts and prevents a collision between external objects and particularly of the tool machine cabin wall with the operating panel, especially with the display unit and/or the input unit on this side of the operating panel. Furthermore, vibrations can be reduced especially advantageously so that electronic components inside the operating panel are also protected against damage caused by the vibrations.

Preferably, a first end portion of the hinge element is mounted on a connecting element, that is intended at an end of the supporting arm, wherein a first damping element is mounted on the connecting element, wherein the horizontal axis preferably extends through the first damping element, and the first damping element preferably extends beyond the connecting element away from the operating panel in the direction of the horizontal axis. The first damping element thus forms an exposed point in the direction of the horizontal axis so that the first damping element absorbs impacts and prevents a collision between external objects and particularly of the machine tool cabin wall with the operating panel, especially with the display unit and/or the input unit on this side of the operating panel. Furthermore, vibrations can be reduced especially advantageously so that electronic components inside the operating panel are also protected against damage caused by the vibrations.

According to a further preferred embodiment, a second damping element is arranged to a second end portion which opposing the first end portion, wherein the second damping element extends beyond the display unit and/or the input unit away from the operating panel in the direction of the horizontal axis. The second damping element thus forms an exposed point in the direction of the horizontal axis at an opposing alignment side of the operating panel, so that the second damping element absorbs impacts and prevents a collision between external objects and particularly of the machine tool cabin wall with the operating panel, especially with the display unit and/or the input unit on the other side of the operating panel. Furthermore, vibrations can be reduced especially advantageously so that electronic components inside the operating panel are also protected against damage caused by the vibrations.

According to a further preferred embodiment, the supporting arm comprises an L-form, wherein a horizontal arm portion of the supporting arm can be mounted on the machine tool by means of a hinge, and the connecting element is mounted on an upwardly extending arm portion of the supporting arm, wherein the connecting element can be pivoted relatively to the upwardly extending arm portion about a second vertical axis (i.e. particularly parallel to the axis of the hinge of the machine tool).

This allows an especially optimal usability of the machine tool as the operator can, by pivoting the supporting arm, pivot the operating panel to a place where he can see a working space of the machine tool from a position, desired by him, for surveillance of the process, while he uses the operating panel on the one hand and adapt the orientation of the operating panel to his visual axis to the working space on the other hand, by pivoting the operating panel relatively to the supporting arm.

According to a preferred embodiment of the invention, the at least one damping element comprises a plastic material, particularly preferably an elastic plastic material, which is suitable for absorbing impacts because of an elastic deformation.

Preferably, at least the one damping element is releasably mounted on the apparatus. This has the advantage that the damping element or damping elements, if damaged, can be easily changed by non-trained operators on-site in a machine hall without affecting the operation of the machine. In the event of damage to the operating panel itself (e.g. the display or input unit) or to the cabin wall or the machine tool, which can occur without damping elements or even damage to electronic components of a numerically controlled device in the inside of the operating panel caused by vibrations, the machine had to be fixed by trained staff where hold-up times of the machine can be expected and the operating panel, as appropriate, had to be exchanged completely.

According to a preferred embodiment of the invention, the operating panel or the operating device and/or control device, for example, comprises a display unit for displaying the machine tool control information and an input unit for inputting the tool machine control information, wherein the display unit can preferably be pivoted about a horizontal axis relatively to the input unit. In this context, horizontal generally means horizontal with respect to a workshop floor on which the tool machine can be set up.

A first end of the axle element can extend beyond the display unit and/or the input unit in axial direction, wherein a preferred first damping element is then arranged at the first end of the axle elements. Due to the fact that the first end of the axle element extends beyond the display unit and/or the input unit in axial direction, the operating panel is very likely to push against the machine tool or an external object at this exposed point and therefore the mounting of damping elements on this position is very advantageous.

The damping element can be removably threaded on a thread which is arranged at the first end of the axle element or removably attachable on a receiving portion of the apparatus. Thus, different damping elements can be used, as required. For example, high damping damping elements can be used when heavy impacts are to be expected.

Furthermore, it is preferably possible that the damping elements, if damaged, can be exchanged by non-trained operators on-site in a machine hall without affecting the operation of the machine. In the event of damage to the operating panel itself (e.g. the display or input unit) or even damage to a cabin wall of a machine tool, which can occur without damping elements, the machine had to be fixed by trained staff where hold-up times of the machine can be expected and during which the operating panel, as appropriate, had to be exchanged.

The supporting arm can be connected to a second end of the axle element in such a way that a first portion of the supporting arm which adjoins the second end of the axle element, at least substantially extends away from the operating panel in axial direction. In this case a second damping element can preferably be provided to an end of the first portion of the supporting arm averted from the operating panel, preferable at axle level of the horizontal axis, preferable in such a way that the imaginary axis extends in an extension through the at least one damping element.

Preferably, the supporting arm extends downwards in a second portion, starting from the end of the first portion averted from the axle element, and then extends towards the machine tool in a third portion (especially preferably in a L-form), and comprises an alignment of the second portion of the supporting arm in the direction of the third portion, a first component that horizontally extends towards the machine tool and a second component that vertically extends towards the floor, wherein the first component is smaller than the second component, thus the end of the first portion averted from the axle element is an exposed point as well, where impacts often occur. In this case, the end of the first portion averted from the axle element forms the most distant point of the supporting arm of the machine tool. Thus, it is particularly appropriate to provide a damping element at this position.

The at least one damping element can, for example, consist of any desired elastic plastic material or an elastic foam. Alternatively, e.g. a spring device with a spring element, can also be provided.

In the following, the invention is explained in more detail with reference to the is figures in an example of the embodiments.

FIG. 2D shows the apparatus according to FIG. 2A in a second back perspective view.

FIGS. 1A to 1C show an apparatus 1 according to an embodiment of the invention.

Figure 1A:
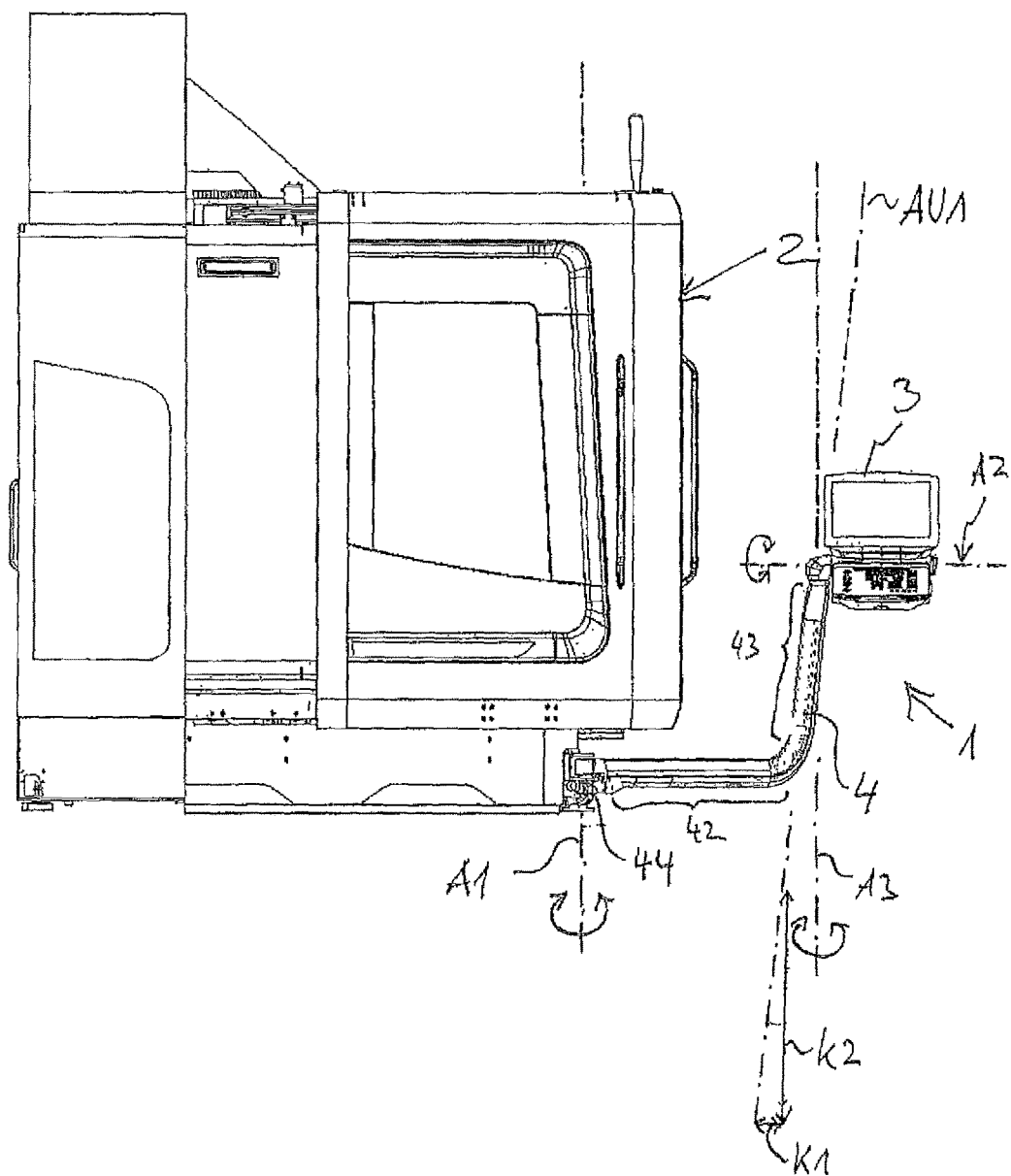
FIG. 1A shows an apparatus according to an embodiment of the invention in a front view with the machine tool.
Figure 1B:
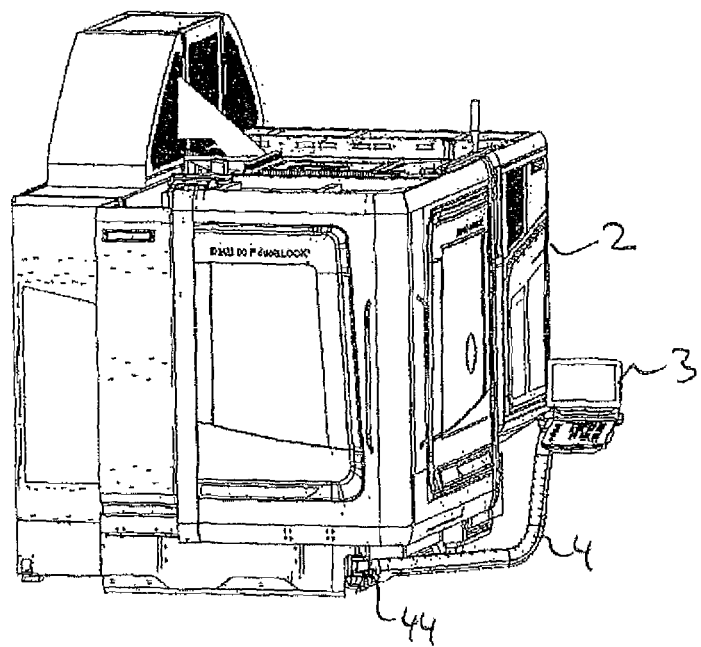
FIG. 1B shows the apparatus according to FIG. 1 in a perspective view with the machine tool.
Figure 1C:
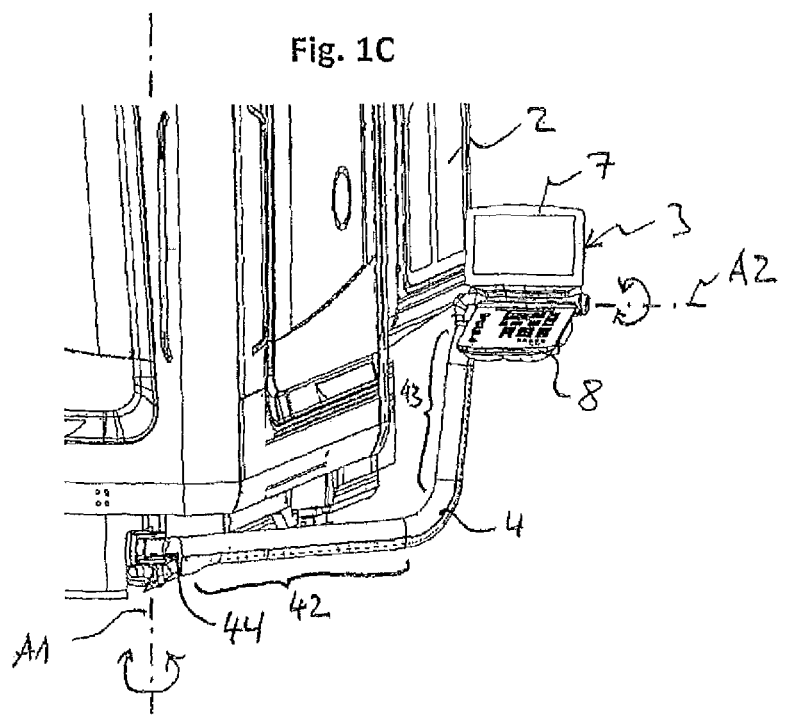
FIG. 1C shows a detail of the apparatus according to FIG. 1 a perspective view with the machine tool

In particular, FIG. 1A shows an apparatus according to an embodiment of the invention in a front view with the machine tool, FIG. 1B the apparatus according to FIG. 1 in a perspective view with the machine tool and FIG. 1C a detail of the apparatus according to FIG. 1 in a perspective view with the machine tool. The apparatus 1 comprises an operating panel 3 for operating/controlling of a machine tool 2 as well as a supporting arm 4, via which the operating panel 3 is connected to the machine tool 2, and, in particular, is pivotally mounted on the machine tool by means of a hinge 44.

Particularly in this embodiment, the supporting arm 4 is pivotally mounted on the hinge 44 and, by pivoting, it is rotatable about a first vertical axis A1 which is vertically orientated to the workshop floor, wherein the operating panel 3 is also pivotable about the first vertical axis A1 by pivoting the supporting arm 4. In this case, the vertical axis A1 is orientated in such a manner that it is substantially vertically oriented to the workshop floor when setting up the machine tool on a flat workshop floor.

Furthermore, the operating panel 3 is pivotable mounted by a second degree of freedom on the supporting arm 4. In this case, the operating panel 3 can be rotated vertically to the supporting arm 4 about a second vertical axis A3. In this case, the second vertical axis A3 is also orientated in such a manner that it is generally vertically orientated to the workshop floor, when setting up the machine tool on a flat workshop floor, so that both, the vertical axis A1 and the vertical axis A3 are orientated parallel to each other.

Furthermore, the operating panel 3 is pivotable mounted by a third degree of freedom on the supporting arm 4. In this case, the complete operating panel 3, or only parts of it, can be rotated relatively to the supporting arm 4 about a horizontal axis A2. In this case, the horizontal axis A2 is orientated in such a manner that it is orientated substantially parallel to the workshop floor, when setting up the machine tool on a flat workshop floor, so that the horizontal axis A2 is generally vertically orientated to the two vertical axes.
The above configuration and the pivotability and axes are constructed in such a way that each pivoting of the operating panel 3 about one or more of the axes A1, A2 and A3 keeps the distance of the operating panel 3 to the workshop floor substantially constant (wherein parts of the operating panel can change the distance to the workshop floor by rotating about the horizontal axis).
Furthermore, the supporting arm 43 is generally L-shaped and comprises a horizontal extending portion 42 which is mounted on the hinge 44 and has an upwardly extending portion 43 which extends in the direction of an axis AU1. In this case, the axis is orientated at an acute angel to the vertical axis A3 in such a way that the upwardly extending portion 43, which extends to the operating panel, distances from the machine tool and the lower part of the portion 43 has a shorter distance to the machine tool 2 than an upper end of the portion 43. This has the advantage that the operator has got more standing room or seating beneath the operating panel at a side extending towards the supporting arm 4.

Figure 2A:
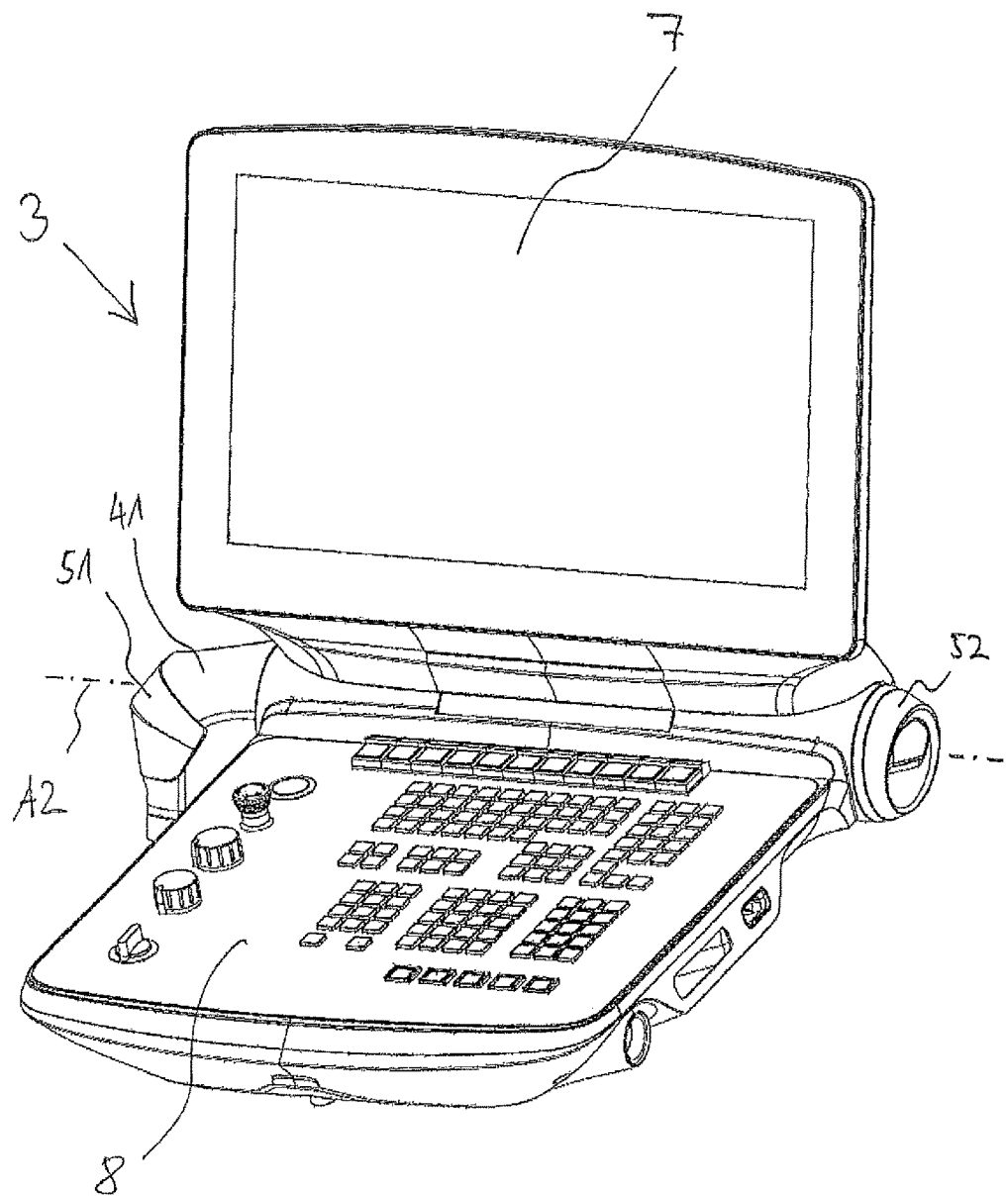
FIG. 2A shows an apparatus according to an embodiment of the invention in a front perspective view.
Figure 2B:
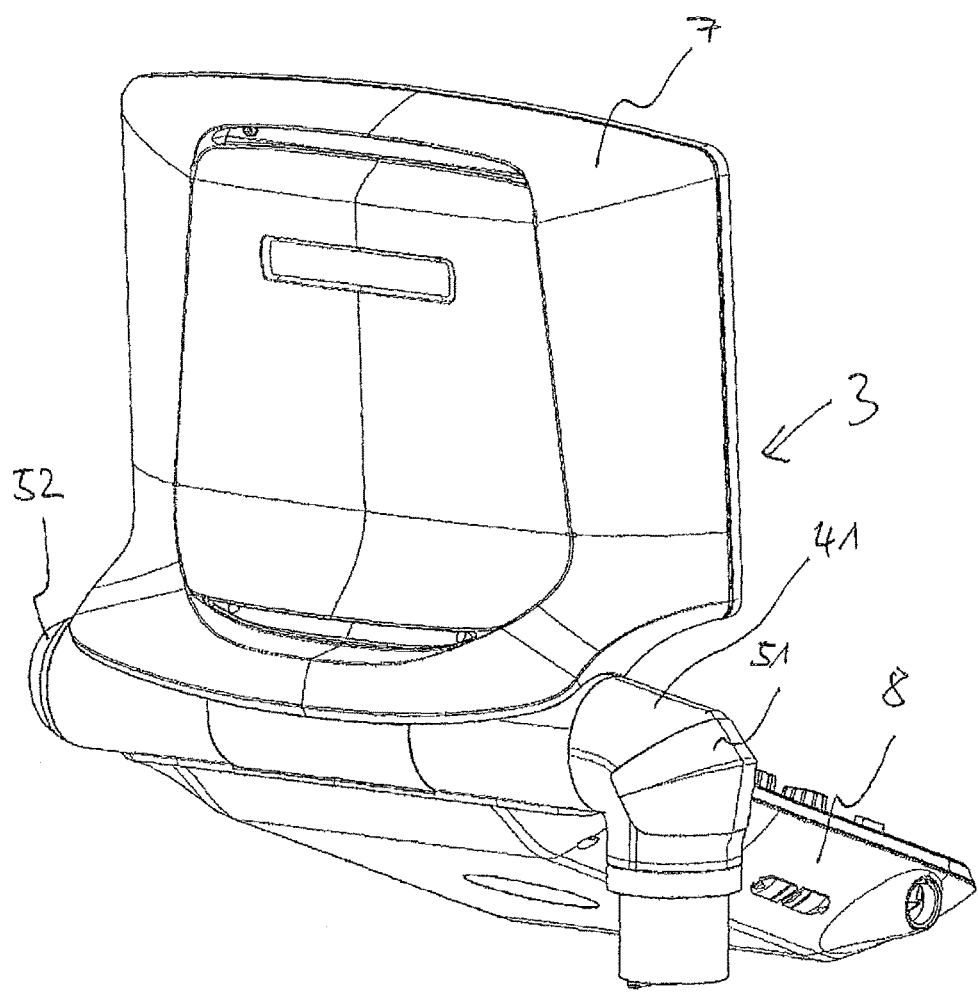
FIG. 2B shows the apparatus according to FIG. 2A in a first back perspective view.
Figure 2C:
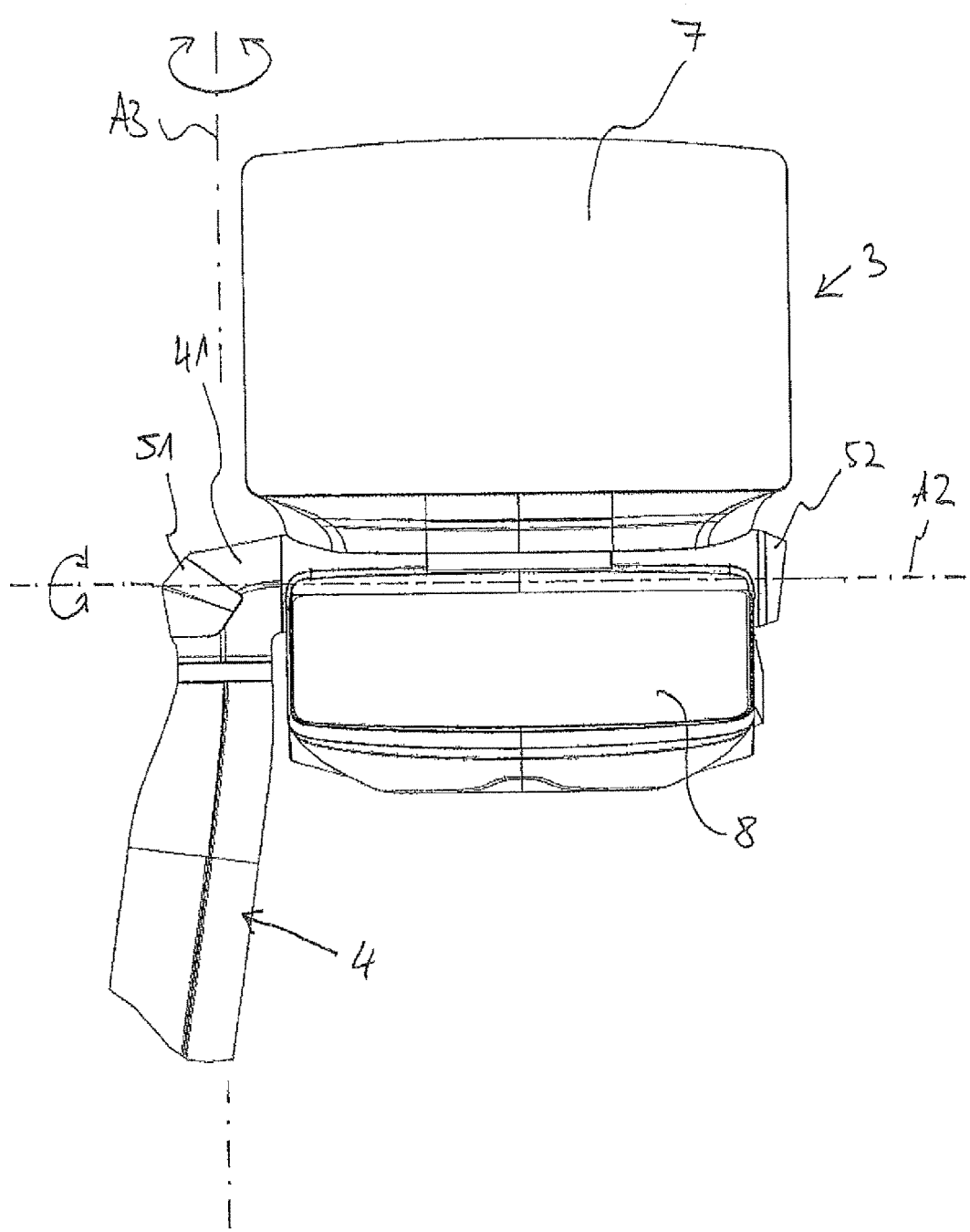
FIG. 2C shows the apparatus according to FIG. 2A in a front view.

FIG. 2A shows an apparatus according to an embodiment of the invention in so a front perspective view. FIG. 2B shows the apparatus according to FIG. 2A in a first back perspective view. FIG. 2C shows the apparatus according to FIG. 2A in a front view and FIG. 2D shows the apparatus according to FIG. 2A in a second back perspective view.

The apparatus 1 according to the embodiment of FIGS. 2A to 2D is provided with damping elements 51 and 52 on opposite sides of the operating panel that dampen the vibrations of the apparatus 1 (especially of the operating panel 3), which occur, if the apparatus 1 bumps against the machine tool 2 or its housing or an external object as a result of a relative movement between the apparatus 1 and the machine tool 2.

As particularly shown in FIG. 2A, the operating panel 3 comprises a display unit 7 for displaying the machine tool control information and an input unit 8 for inputting the machine tool control information.

In the preferred embodiment the display unit 7 can be relatively pivoted towards the input unit 8 by an axle body 9 (subsequently referred to as "hinge element") (see also FIG. 3). Thus, both the display unit 7 and the input unit 8 can be rotated independently of one another about the horizontal axis A2 (see also FIG. 4). The horizontal axis extends through the damping elements 51 and 52 arranged on both sides.

The damping elements 51 and 52 can be detachably mounted, attached onto a receiving portion or threaded onto a thread (not shown). Thus, differently embodied first damping elements 51 and 52 of different sizes and materials can be used, as requested. For example, highly damping damping elements can be used, if heavy impacts are to be expected.

The supporting arm 4 is connected to an end 91 of the hinge element 9 by means of a hinge element 41 in such a way, that an end portion of the supporting arm 4 adjoining to an end of the hinge element 9 (at least a portion of the connecting piece 41) generally extends away from the operating panel in axial direction A2. In this case, the damping element 51 is provided at an end of the connecting piece 41 of the supporting arm 4 averted from the hinge element 9.

The orientation of AU1 of the arm portion 43 of the supporting arm 4 comprises a first component K1 horizontally extending towards the machine tool and a second component K2 vertically extending towards the floor, wherein the first component K1 is smaller than the second component K2.

In other words: The orientation AU1 of the portion 43 is inclined relatively to the vertical in such a way that the upper end of the portion 43 is more distant from the machine tool 1 than the lower end of the portion 43. Thus, the end of the hinge element of the supporting arm 4 averted from the hinge element 9 is an exposed point, where impacts often occur. Thus, a second damping element 52 is provided at this position.

Figure 3:
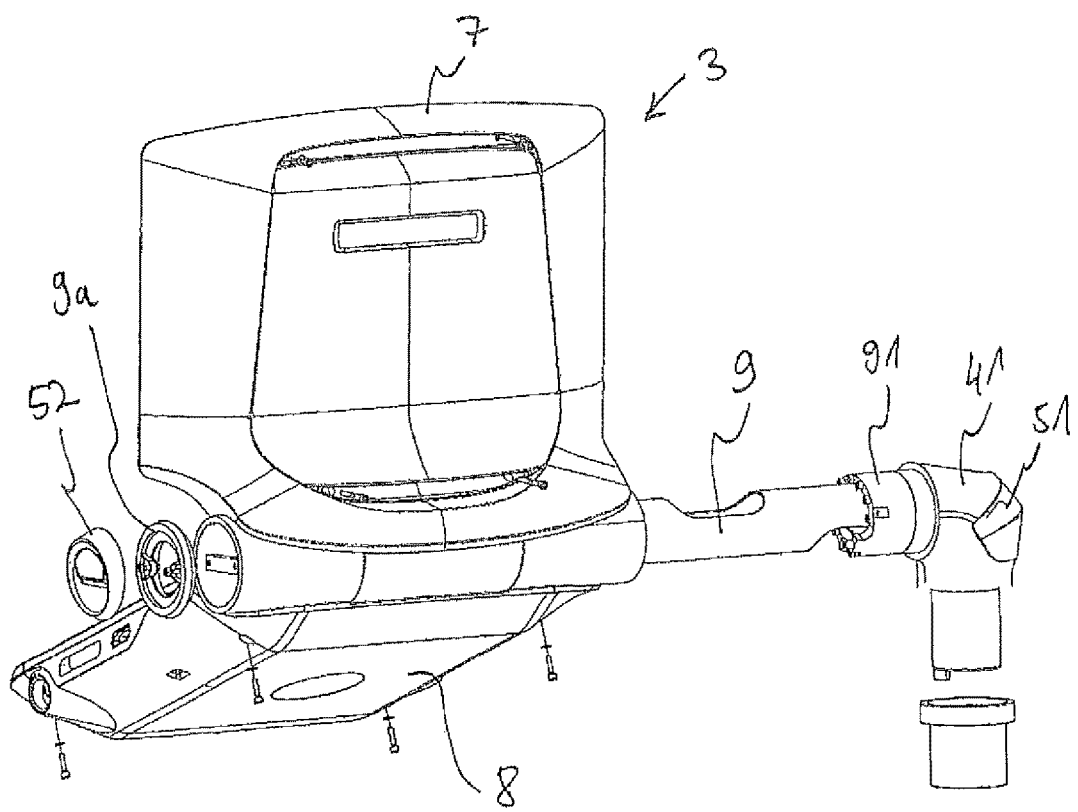
FIG. 3 shows the apparatus according to FIG. 2A in a perspective view according to the direction of the view of FIG. 2D as an exploded view and FIG. 4 a side view of the apparatus according to FIG. 2A. Identical or corresponding parts, components or groups of components are, when useful, marked with the same reference marks in the invention.

FIG. 3 shows an apparatus according to FIG. 2A in a perspective view according to the viewing direction of FIG. 2D as exploded view.

Herewith, the hinge element 9 which extends from a first end to a second end of the operating panel 3 along the horizontal axis A2 is visible, and on which the display unit 7 and the input unit 8 are each rotatably arranged or stored about the horizontal axis A2. The damping element 52 is mounted on an end of the operating panel 3 via an annular fixing element 9a, wherein the damping element 52 can be mounted on the apparatus 1, preferably by plugging onto the fixing element 9a and/or by snapping into the fixing element 9a, especially detachably mounted.

On the side of the operating panel 3 opposite to the damping element 52 in axial direction, an end portion 91 of the hinge element 9 is mounted on the connecting piece 41 of the supporting arm 4. On the side of the connecting piece 41 averted from the operating panel in axial direction A2 the damping element 51 is mounted on the connecting piece 41 of the supporting arm 4. The damping element 51 can preferably plugged onto the connecting piece 41 of the supporting arm 4 and/or snapped into the connecting element 41, so that it can especially preferably mounted detachably on the connecting piece 41.

According to the preceding explanation, the connecting piece 41 of the supporting arm 4 is mounted on the supporting arm 4 in such a way that the operating panel 3 can be pivoted relatively to the supporting arm 4 about the vertical axis A3 (that means vertically to the horizontal axis A2). The connecting piece 41 of the supporting arm 4 is particularly mounted rotatably on the supporting arm 4 in a bearing manner so that the connecting piece 41 is relatively rotatable to the portions 42 and 43 of the supporting arm 4 about the vertical axis A3 and the operating panel 3 is pivoted relatively to the supporting arm 4 about the vertical axis A3, by rotation of the connecting piece 41 relatively to the portions 42 and 43 of the supporting arm 4. This has the advantage that the arrangement and orientation of the damping element 51 and operating panel 3 remain unchanged when pivoting the operating panel 3 about the vertical axis A3 and, thus, the operating panel 3 on the side of the connecting piece 41 and the supporting arm 4 remains protected by the damping element 51 independently of the pivoting direction about the vertical axis A3.

Figure 4:
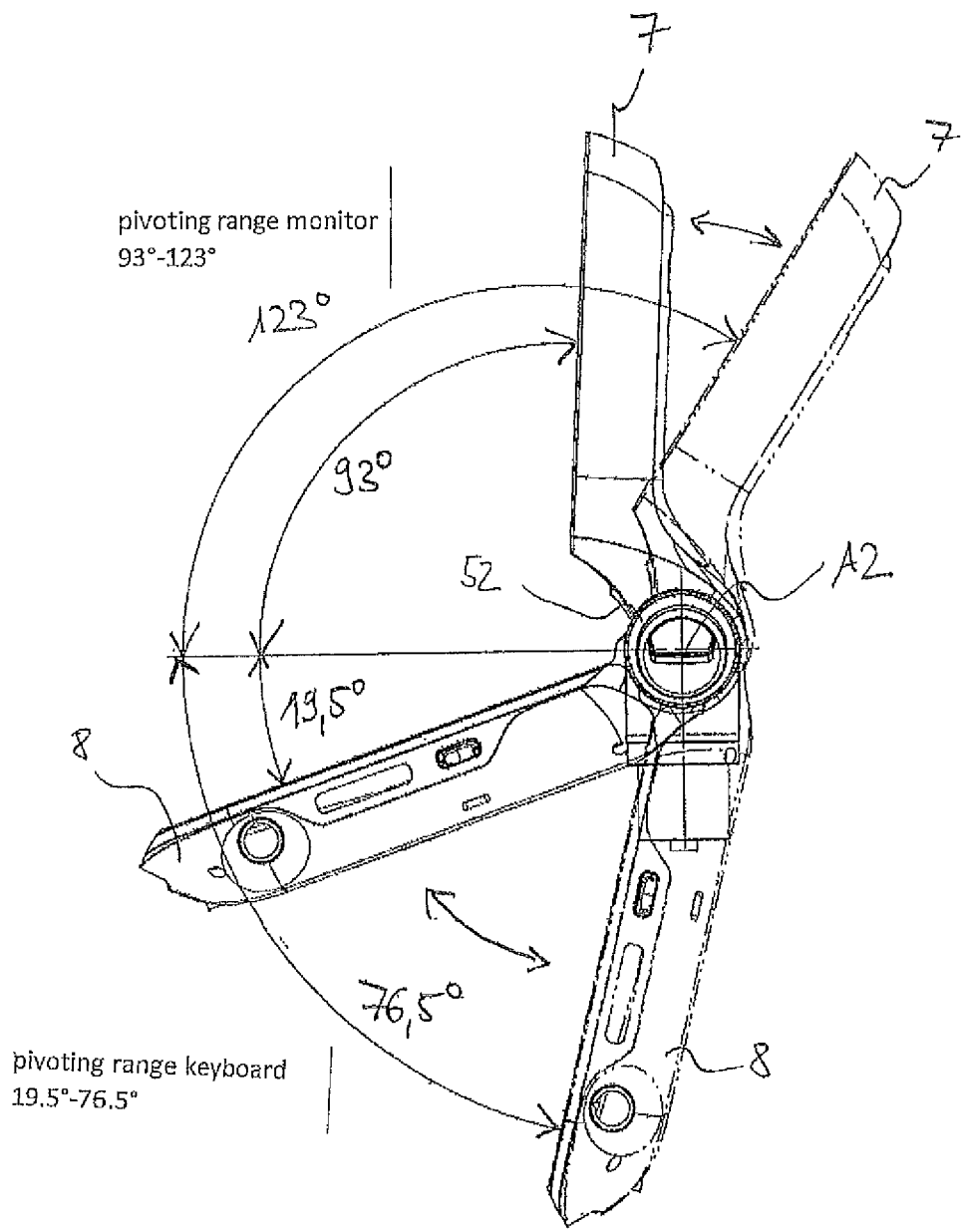

FIG. 4 shows a side view of the apparatus according to FIG. 2A. Herewith, the independent pivoting of the display unit 7 and the input unit 8 about the horizontal axis A2 perpendicular to the horizontal axis A2 is illustrated. A pivoting range of the display unit 7 is from 93° to 123° above and in relation to the horizontal plane and the pivoting range of the input unit 8 from 19.5° to 76° below and in relation to the horizontal plane.

Additional damping elements may also be provided at other suitable positions of the supporting arm 4 and operating panel 4. According to the invention, many kinds of impacts can be damped by mounting a damping element on suitable positions of the operating panel 3 and/or supporting arm 4. In this way, impacts can be mitigated which occur by pivoting too far along an arc so that the operating panel 3 bumps against the machine tool 2 or other objects that are on the path along which the operating panel 3 is directed by pivoting the supporting arm 4. Furthermore, impacts can be mitigated which occur when the supporting arm 4 is drawn into the machine tool 2 or a door 6 of the machine tool 1 opposite to the operating panel 3 is opened to far in the direction of the operating panel 3.

The invention claimed is:

1. Apparatus for use with a machine tool, comprising:
    an operating panel via which the machine tool can be controlled by a user, and
    a supporting arm supporting the operating panel and the supporting arm being mounted on the machine tool by means of a hinge in such a way that the supporting arm holding the operating panel can be pivoted relatively to the machine tool about a vertical axis of the hinge, wherein
    the operating panel comprises a hinge element, which is held by the supporting arm, on which a display unit and an input unit of the operating panel are held, wherein the hinge element extends along a horizontal axis and the display unit and/or the input unit can be pivoted about the horizontal axis, and a first end portion of the hinge element is mounted on a connecting element which is provided at an end of the supporting arm,
    two damping elements, which are arranged on opposite sides at the operating panel in such a way that the horizontal axis extends through both damping elements, wherein each of the damping elements is adapted to dampen an impact to the apparatus that occurs, because of the collision between the apparatus and the machine tool, when the supporting arm is pivoted with respect to the machine tool about a vertical axis,
    a first damping element of the two damping elements is mounted on the connecting element and extends beyond the display unit and/or the input unit away from the operating panel in the direction of the horizontal axis, and
    a second damping element of the two damping elements is arranged at a second end portion of the hinge element opposite to the first end portion and extends beyond the display unit and/or the input unit away from the operating panel, at the side opposite to the first damping element, in the direction of the horizontal axis.

2. Apparatus according to claim 1, wherein
the supporting arm comprises an L-shape, wherein a horizontal arm portion of the supporting arm can be mounted on the machine tool by means of the hinge and the connecting element is mounted on an upwardly extending arm portion of the supporting arm, wherein the connecting element can be pivoted relatively to the upwardly extending arm portion about a second vertical axis.

3. Apparatus according to claim 1, wherein
the damping elements comprise a plastic material.

4. Apparatus according to claim 3, wherein
the damping elements comprise an elastic plastic material.

5. Apparatus according to claim 1, wherein
the damping elements are detachably mounted on the apparatus.

6. A numerically controlled machine tool, comprising:
an apparatus according to claim 1 and
a hinge,
wherein the supporting arm holds the operating panel and is mounted on the machine tool in such a way that the supporting arm holding the operating panel can be pivoted relatively to the machine tool about the vertical axis of the hinge.

7. Apparatus according to claim 1, wherein
the first damping element is removably threaded on a thread on the connecting element, and
the second damping element is removably threaded on a thread which is arranged at the second end portion of the hinge element.

8. Apparatus according to claim 1, wherein
at least one of the first damping element and the second damping element comprises an elastic foam.

9. Apparatus according to claim 1, wherein
at least one of the first damping element and the second damping element comprises a spring device.

* * * * *